Aug. 13, 1963  A. BOUGEARD  3,100,635
PNEUMATIC DEVICE CONSTITUTING SUSPENSION AND DAMPING MEANS
Original Filed June 19, 1957
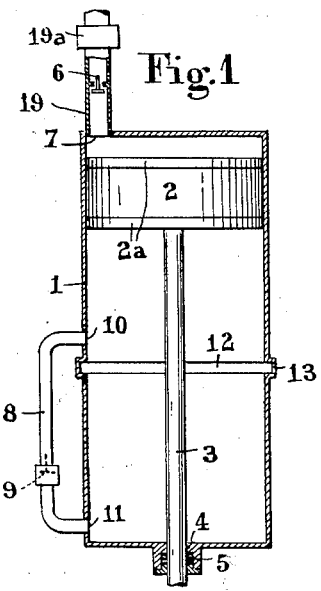
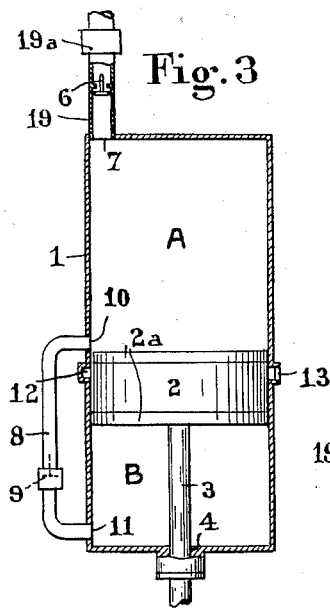
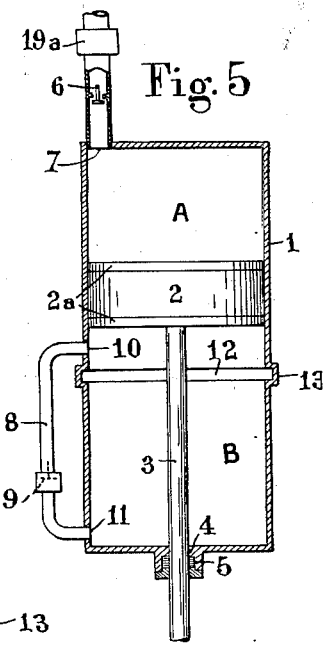
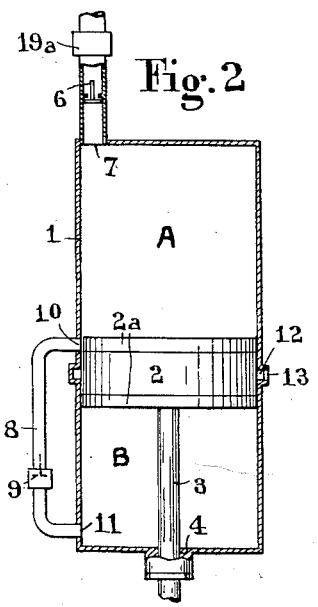
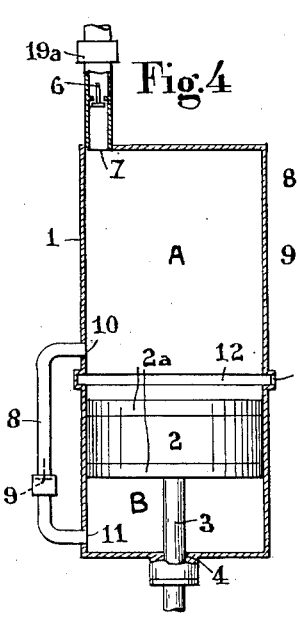
INVENTOR
ARTHUR BOUGEARD
BY
MICHAEL S. STRIKER
ATTORNEY United States Patent Office 3,100,635
Patented Aug. 13, 1963

3,100,635
PNEUMATIC DEVICE CONSTITUTING SUSPENSION AND DAMPING MEANS
Arthur Bougeard, 25 Boulevard Pierre Landais, Vitre, France
Continuation of application Ser. No. 666,711, June 19, 1957. This application Jan. 30, 1961, Ser. No. 85,760
Claims priority, application France June 27, 1956
5 Claims. (Cl. 267—65)

This application is a continuation of my copending application Serial No. 666,711, filed June 19, 1957, and now abandoned.

This invention relates to a pneumatic elastic return or damping devices which constitute suspension means and if desired damping means between two members or parts. This device is applicable, for example, to automotive vehicles, between the body of a vehicle and the stub axle of each wheel.

This device utilizes compressed air as a return or reaction agent for compensating any effort tending to modify the relative positions of the various members of the device concerned.

This device consists essentially of a cylinder connected with one of the two members to be interconnected, and of a piston connected with the other member through its rod and sliding in a fluid-tight manner in said cylinder so as to divide it into two compartments or chambers one of which comprises an inlet port for a gas under pressure. This device is characterized in that on the one hand the two compartments are interconnected through means permitting a communication beween these compartments when the piston moves toward the other compartment opposite to that in which the inlet port opens, and in that, on the other hand, an exhaust passage leading to the outside is provided whereby the aforesaid other compartment can communicate with the exterior when the piston moves toward the first compartment. In this device, the communication means between the two compartments and the exhaust passage is closed when the piston is in its normal operative position at an intermediate point of the cylinder length or piston stroke, both compartments containing in this case gas but at different pressures.

Then, the piston is in a position of relative equilibrium, with respect to the cylinder, under the influence on the one hand of the external loads transmitted by the rod, and on the other hand of the differential pressure between the two compartments.

Besides, other features and advantages of the elastic device of this invention will appear as the following description proceeds with reference to the attached drawings forming part of this specification and illustrating diagrammatically by way of example an embodiment of the invention.

In the drawings:

FIGURE 1 is an axial diagrammatic section showing a first embodiment of the elastic device in its inoperative position;

FIGURE 2 is a similar diagram showing this device with the piston in equilibrium in its normal operative position; and FIGURES 3, 4 and 5 are diagrams similar to FIGS. 1 and 2, illustrating this device with the piston positioned beyond its position of equilibrium.

The elastic device shown in FIGS. 1 to 5 consist essentially of a cylinder 1 having slidably mounted therein a piston 2 of cross-sectional area S; this piston divides the cylinder 1 into two compartments and is fixedly connected with a piston rod 3 extending through an aperture 4 provided in the bottom of the cylinder, this rod 3 being attached to one of the two movable members to be resiliently interconnected, the other movable member being connected to the cylinder. Thus, when the device is utilized in an automotive vehicle comprising such a device for each wheel, the frame of this vehicle is carried by the cylinder of the device, while the piston rod is carried in turn by the wheel stub axle.

The fluid tightness of the device is insured on the one hand by piston rings 2a and on the other hand by a rod packing 5 associated with the aperture 4. The assembly is fed with compressed air from an external source (not shown) through the medium of a conduct 19 comprising a non-return valve 6 positioned in the vicinity of an inlet port 7 provided at one end of the cylinder. The inlet conduct 19 comprises also a manometer 19a adapted to maintain a constant pressure in the corresponding compartment of the cylinder 1 during the operation of the device.

Besides, an external pipe line 8 comprising similarly a non-return valve 9 connects a port 10 formed in the central portion of the cylinder, which is the normal location of the piston, to another port 11 formed in the cylinder wall but at the cylinder end opposite to that provided with the port 7. On the other hand, a vent-hole 13 is provided intermediate the two ports 10, 11, the distance between this vent-hole 13 and the port 10 being smaller than the height of the piston 2. Level with the vent-hole 13 is a circular groove 12 formed in the inner wall of the cylinder, as shown.

When the device is inoperative, the weight of the member supported thereby, which is secured on the cylinder, for example the body of an automotive vehicle, tends to force the upper end of the cylinder against the piston 2 having its rod supported by the other member connected to the device, for example, in the case of its application to a vehicle, the stub axle of a wheel thereof (see FIG. 1).

To attain the operative position illustrated in FIG. 2, it is necessary to introduce compressed air through the non-return valve 6 under a pressure $p$ such that $pS>P$, P designating the aggregate normal loads to be supported by the assembly, the manometer being determined for supplying the desired pressure, i.e. the weight, complete or partial, of the piece carried by the cylinder 1.

This pressure will cause the piston 2 to progressively move toward the position in which it is shown in FIG. 2, the air trapped in the cylinder portion opposite to that communicating with the port 7 escaping at the same time without any difficulty through the vent-hole 13. Then, the piston will divide the cylinder into two compartments A and B, the upper compartment A corresponding to that portion of the cylinder which communicates with the port 7.

As the piston movement is not counteracted by any pressure in the lower compartment B, it continues and the piston will finally obturate the vent-hole 13. Then, the piston moves beyond the inlet port 10 of pipe line 8 (see FIG. 3). Thus, the lower compartment B cannot communicate anymore with the external atmosphere through the vent-hole 13 but on the other hand it communicates with the upper compartment A through the pipe line 8. Consequently, the air will flow freely from compartment A to compartment B and in the latter a counter-pressure is thus created, until the respective pressures $p_A$ and $p_B$ of compartments A and B are such that $(p_A - p_B)S = P$. The pressure $p_A$ remains constant as it is the pressure $p$ determined by the manometer 19a.

When the piston 2 is in equilibrium, it obturates not only the vent-hole 13, but also the port 10 (FIG. 2). In this position, any air leaks that may occur through the rod packing 5 are compensated by a supply of fresh air from compartment A to compartment B, the normal position of operation of the piston being such that the least movement thereof in the direction tending to reduce the volume of compartment B will cause a partial opening or uncovering of the port 10. Besides, any air leaking (most probably) from compartment A to compartment B but between the piston rings and the cylinder bore, will be vented to the atmosphere through the groove 12 and hole 13. The same applies to any air flowing in the direction from B to A around the piston.

In the normal operative position illustrated in FIG. 2 the device constitutes an elastic suspension device for the member secured on the cylinder 1, for example the body of an automotive vehicle. In fact, the weight P of this member, or that fraction of this weight which is to be supported by the device is balanced by the pressure differential existing between the compartments A and B, since $(p_A-p_B)S=P$. This arrangement of piston 2 in equilibrium at an intermediate level of the cylinder will then enable the device to act as an elastic suspension device, and possibly as a shock absorber.

Any external effort causing a sudden or slow overloading or unloading of the piston rod will produce a relative displacement of the piston with respect to the cylinder in one or the other direction against the elastic resistance of the air present in one or the other compartment A or B.

In case of a ascendant movement of the piston which tends to slowly or suddenly reduce the volume of compartment A, the air contained therein will be compressed since it cannot escape through the port 7 due to the provision of the non-return valve 6 therein; on the other hand, any air contained in the lower compartment B undergoes a relative pressure reduction resulting from the increase in volume without any increase in the mass, since no air can be admitted through the external pipe line 8 as its port 10, at this time, does not communicate with the compartment A. The differential pressure between compartments A and B becomes higher than the load and causes the piston to move in the direction tending to increase the volume of compartment A and reduce that of compartment B, that is, in the direction opposite to that resulting directly from the application of the aforesaid overload or unloading.

If the intensity of the load variation has been such that the piston during the initial portion of its movement has uncovered the groove 12 and vent-hole 13 (see FIG. 5), the air contained in compartment B will escape freely through this hole 13 and accentuate the relative pressure reduction in this compartment, thereby promoting the movement of the piston to its initial position of equilibrium.

If the external action having caused the upward movement of piston 2 is accidental, for example in the specific case of the application of the device to an automotive vehicle, and if this action results from the passage of the relevant wheel on a road boss or like unevenness, the pressure $p_B$ in compartment B resumes the same value as before when the piston resumes its position of equilibrium.

However, if this action is of extended duration, for example in the case of the application of the device to an automotive vehicle, if the cause is an increase in the load to be transported, the piston will resume its position of equilibrium when the pressure in compartment B, has been reduced to another value $p'_B$ such that $$p_A-p'_B)S=P'$$

(P′ designating the novel load to be supported). In this case it must be emphasized more particularly that in spite of the increment in load the piston is still in equilibrium at the same level in cylinder 1, so that in the case of the application of the device to the automotive construction the body will constantly remain at the same level.

In the reverse case, that is, that of a relative initial movement of the piston which tends to increase the volume of compartment A, it is necessary to consider the manner in which the external effort is applied:

(1) If the load variation is slow, the air, by flowing from compartment A where the air pressure is higher, to compartment B through the port 10 uncovered by the piston, will restore immediately the equilibrium of the piston in its normal position;

(2) If the load variation takes place rather suddenly, the air contained in compartment B will be suddenly compressed as the valve 9 will prevent any air from flowing in the external pipe line 8 in the direction from compartment B to compartment A (FIG. 3). Then, the differential pressure between compartments A and B will immediately urge the piston 2 in the direction from B to A which is opposite to the direction of the initial movement.

As in the preceding case, if the external action having caused the downward movement of the piston is accidental, for example when the relevant wheel rolls into a pot-hole, in the specific case of the application of this device to an automotive vehicle, the pressure $p_B$ in compartment B will resume the same value as before when the piston resumes its position of equilibrium.

However, if this action is extended in time, for example in the case of the application of the device to an automotive vehicle, as when the load transported by the vehicle is reduced, the piston will resume its position of equilibrium when the piston in compartment B will have attained a novel value $p''_B$ such that $(p_A-p''_B)$ SP″ (P″ being the novel, lower load to be supported). This result is obtained because the compressed air can flow from A to B through passage 8 as long as the equilibrium is not restored, the pressure in compartment A remaining on the other hand constant since this compartment is connected permanently to the source of compressed air which, due to the provision of a pressure gage 19a, is adapted to maintain the desired pressure in compartment A. Thus, in spite of the reduction in the load to be transported, the piston will constantly be in equilibrium at the same level in cylinder 1, so that in the specific case, contemplated hereinabove, of the application of the device to an automotive vehicle the body thereof will constantly remain at the same level.

The elastic device forming the subject-matter of this invention is applicable to any apparatus, machines and installations subjected during their operation to accidental or voluntary variable efforts.

Besides, the device is also applicable as suspension means and if desired as damping means between two members or parts of an installation. This installation may comprise one or more pneumatic devices of the type described hereinabove and a separate or common source of compressed air communicating with the inlet orifice of the cylinder of each device. This system is such that the source of compressed air will supply preferably automatically air to the cylinders at the beginning of each operation and then as required for a constant pressure in the compartment A of each device.

Thus, for example, an automotive vehicle may be equipped with a suspension system consisting of a network comprising for each wheel a device according to this invention which is fed from a separate or a common auxiliary source of compressed air, the cylinder of the device concerned being connected with the frame of the vehicle and the piston-rod connected with the stub axle of the corresponding wheel.

The elastic pneumatic system according to this invention is particularly advantageous whenever an easily workable source of compressed air is available, as in the case, for example, of a fixed installation comprising machine tools the operation of which requires the use of particularly efficient shock-absorbers or dash-pots.

It will be readily understood by anybody conversant with the art that the applications of the elastic pneumatic device of this invention are not confined to the examples suggested herein. On the other hand, the device of the invention is not limited in itself to the embodiment shown and described, as many modifications as to its details, form and relative proportions may be brought thereto.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A pneumatic shock absorbing device adapted to interconnect a pair of members movable with respect to each other, comprising, in combination, a working cylinder adapted to be connected to one of said members and having a cylindrical wall with closed ends; a one-way air supply connection for supplying compressed air from its source to the interior of the cylinder in the region of one end thereof while preventing reverse flow therefrom; a one-way flow bypass means for said cylinder having one end portion communicating with an intermediate portion of the interior of the cylinder spaced from both ends thereof and another opposite end portion communicating with said interior in the region of the opposite end of the cylinder permitting compressed air to bypass from said one end portion to said another opposite end portion of the bypass means only; vent opening means arranged in said cylindrical wall, between the end portions of the by-pass means, for venting compressed air from said intermediate portion of said cylinder; and a working piston reciprocable in said cylinder and having a piston rod adapted to be connected to the other of said members and extending through one end of the cylinder in sealing relationship therewith.

2. A pneumatic shock absorbing device adapted to interconnect a pair of members movable with respect to each other, comprising, in combination, a working cylinder adapted to be connected to one of said members and having a cylindrical wall with closed ends; a supply connection for supplying compressed air from its source to the interior of the cylinder in the region of one end thereof; first one way valve means cooperatively associated with said supply connection for admitting the compressed air while preventing reverse flow therethrough; flow bypass means for said cylinder having one end portion communicating with an intermediate portion of the interior of the cylinder spaced from both ends thereof and another end portion communicating with said interior in the region of the opposite end of the cylinder permitting compressed air to bypass in a direction from said one end portion to said another end portion of the bypass means only; second one-way valve means cooperatively associated with said by-pass means to permit said bypass in said direction while preventing reverse flow therethrough; vent opening means arranged in said cylindrical wall, between the end portions of the by-pass means, for venting compressed air from said intermediate portion of said cylinder; and a working piston reciprocable in said cylinder and having a piston rod adapted to be connected to the other of said members and extending through one end of the cylinder in sealing relationship therewith, said piston being shaped and arranged so as to be movable from a balancing position closing both said one end of said bypass means and said vent opening means into two opposite shock absorbing positions, namely, one shock absorbing position located between said one-way air supply connection and said vent opening means and another shock absorbing position located between said other end portion of said one-way flow bypass means and said vent opening means.

3. A pneumatic shock absorbing device adapted to interconnect a pair of members movable with respect to each other, comprising in combination, a working cylinder adapted to be connected to one of said members and having a cylindrical wall with closed ends; a one-way air supply connection for supplying compressed air from its source to the interior of the cylinder in the region of one end thereof while preventing reverse flow therefrom; a flow bypass conduit carried by said cylinder having one end communicating with an intermediate portion of the interior of the cylinder spaced from both ends thereof and another end communicating with said interior in the region of the opposite end of the cylinder permitting compressed air to bypass from said one end portion to said other end portion of the bypass means; one-way valve means cooperatively associated with said by-pass conduit to permit said bypass while preventing reverse flow therethrough; vent opening means arranged in said cylindrical wall, between the ends of the by pass conduit, for venting compressed air from said intermediate portion of said cylinder; and a working piston reciprocable in said cylinder and having a piston rod adapted to be connected to the other of said members and extending through one end of the cylinder in setling relationship therewith, said piston being shaped and arranged so as to be movable from a balancing position closing both said one and of said bypass means and said vent opening means into two opposite shock absorbing positions, namely, one shock absorbing position located between said one-way air supply connection and said vent opening means and another shock absorbing position located between said other end portion of said one-way flow bypass means and said vent opening means.

4. A pneumatic shock absorbing device adapted to interconnect a pair of members movable with respect to each other, comprising, in combination, a working cylinder adapted to be connected to one of said members and having a cylindrical wall with closed ends; a one-way air supply connection for supplying compressed air from its source to the interior of the cylinder in the region of one end thereof while preventing reverse flow therefrom, one-way flow bypass means for said cylinder having one end portion communicating with an intermediate portion of the interior of the cylinder spaced from both ends thereof and another end portion communicating with said interior in the region of the opposite end of the cylinder permitting compressed air to bypass from said one end portion to said other end portion of the bypass means only; vent opening means arranged in said cylindrical wall, between the end portions of the by-pass means, for venting compressed air from said intermediate portions of said cylinder, said vent opening means being spaced from said one end of the bypass means in the axial direction of the cylinder a predetermined distance toward said opposite end thereof; and a working piston reciprocable in said cylinder and having a piston rod adapted to be connected to the other of said member and extending through the opposite end of the cylinder in sealing relationship therewith, said piston being shaped and arranged so as to be movable from a balancing position closing both said one end of said bypass means and said vent opening means into two opposite shock absorbing positions, namely, one shock absorbing position located between said one-way air supply connection and said vent opening means and another shock absorbing position located between said other end portion of said one-way flow bypass means and said vent opening means.

5. A pneumatic shock absorbing device adapted to interconnect a pair of members movable with respect to each other comprising, in combination, a working cylinder adapted to be connected to one of said members and having a cylindrical wall with closed ends; a one-way air supply connection for supplying compressed air from its sources to the interior of the cylinder in the region of one and thereof while preventing reverse flow therefrom; one-way flow bypass conduit means for said cylinder having one end communicating with an intermediate portion of the interior of the cylinder spaced from both ends thereof and another end communicating with said interior in the region of the opposite end of the cylinder permitting compressed air to bypass from said one end portion to said other end portion of the bypass means only; vent opening means arranged in said cylindrical wall, between the ends of the bypass conduit, for venting compressed air from said intermediate portion of said cylinder, said vent opening means being spaced from said one end of the bypass means in the axial direction of the cylinder a predetermined distance toward said opposite end thereof; and a working piston reciprocable in said cylinder and having a piston rod adapted to be connected to the other of said members and extending through said opposite end of the cylinder in sealing relationship therewith, said piston having an effective length sufficient to close both said one end of said bypass means and said vent opening means and being arranged so as to be movable from a balancing position closing both said one end of the bypass means and said vent opening means into two opposite shock absorbing positions, namely, one shock position located between said one-way air supply connection and said vent opening means and another shock absorbing position located between said other end portion of said one-way flow bypass means; and said vent opening means.

References Cited in the file of this patent

UNITED STATES PATENTS

| | | |
|---|---|---|
| 864,141 | Scott | Aug. 20, 1907 |
| 1,036,340 | Rockwell et al. | Aug. 20, 1912 |
| 1,050,287 | Olson | Jan. 14, 1913 |
| 1,980,423 | Messier | Nov. 13, 1934 |
| 2,018,312 | Moulton | Oct. 22, 1935 |
| 2,338,897 | Boulogne | Jan. 11, 1944 |
| 2,715,023 | Nallinger | Aug. 9, 1955 |

FOREIGN PATENTS

| | | |
|---|---|---|
| 256,094 | Germany | Jan. 31, 1913 |
| 164,333 | Great Britain | Mar. 23, 1922 |